United States Patent [19]
Stojic

[11] Patent Number: 5,873,297
[45] Date of Patent: Feb. 23, 1999

[54] FLUID-OPERATED BRAKE ACTUATOR WITH CHECK VALVE

[75] Inventor: Steven M. Stojic, Holland, Mich.

[73] Assignee: Neway Anchorlok International, Inc., Muskegon, Mich.

[21] Appl. No.: 891,051

[22] Filed: Jul. 10, 1997

Related U.S. Application Data

[63] Continuation of PCT/US95/00342, Jan. 10, 1995.

[51] Int. Cl.$^6$ ..................................................... F15B 11/08
[52] U.S. Cl. ................................. 91/444; 91/468; 92/63; 92/82; 137/512.2; 137/849
[58] Field of Search ............................. 91/440, 444, 468; 92/63, 80, 82; 137/512, 512.2, 512.4, 849, 850, 852, 853, 859

[56] References Cited

U.S. PATENT DOCUMENTS

| | | | |
|---|---|---|---|
| 2,894,530 | 7/1959 | Stevens et al. | 137/512 |
| 3,034,731 | 5/1962 | Chapin | 137/849 |
| 3,302,530 | 2/1967 | Dobrikin et al. | 91/440 |
| 3,736,953 | 6/1973 | Vaalburg. | |
| 3,813,994 | 6/1974 | Swander et al. | 92/63 |
| 3,861,416 | 1/1975 | Wichterle | 137/849 |
| 3,957,078 | 5/1976 | Hlinsky | 137/849 |
| 3,983,790 | 10/1976 | Johannesen | 91/444 |

FOREIGN PATENT DOCUMENTS

| | | |
|---|---|---|
| A 0 020 862 | 1/1981 | European Pat. Off. . |
| A 0 123 866 | 11/1984 | European Pat. Off. . |
| A 1 535 063 | 8/1968 | France . |
| 2033705 | 1/1971 | Germany ................................ 137/859 |
| A 94/29573 | 12/1994 | WIPO . |

OTHER PUBLICATIONS

Vernay, Typical Applications for Duckbill checkvalves.

Primary Examiner—F. Daniel Lopez
Attorney, Agent, or Firm—Rader, Fishman, Grauer & McGarry

[57] ABSTRACT

A fluid-operated brake actuator having a check valve in the spring chamber to equalize the pressure on opposite sides of an operating movable diaphragm. The check valve being double redundant and tamper resistant and comprising a tubular body having a first one-way valve disposed and one end of the tubular body and a second one-way valve disposed at an opposite end of the tubular body. A support plate is mounted to the tubular body to support the second valve and prevents the easy removal of the check valve from the brake actuator.

24 Claims, 2 Drawing Sheets

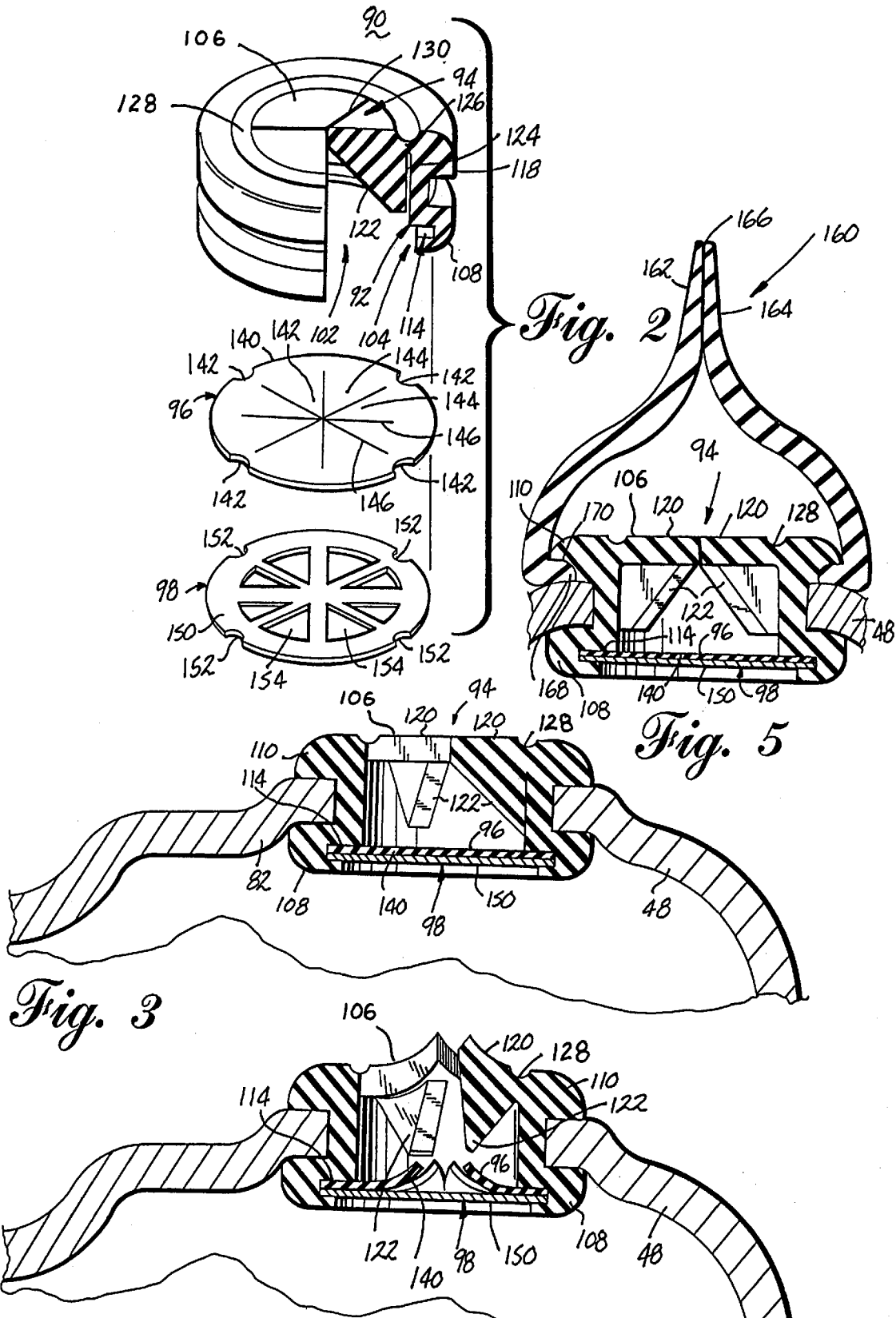

FLUID-OPERATED BRAKE ACTUATOR WITH CHECK VALVE

This application is a continuation of International Application No. PCT/US95/00342 filed Jan. 10, 1995.

BACKGROUND OF THE INVENTION

1. Field of the Invention

The invention relates to fluid-operated brake actuators for vehicles and more particularly to a fluid-operated actuator with a check valve for regulating fluid flow between the fluid-operated brake actuator and the atmosphere.

2. State of the Prior Art

An air brake system for a vehicle such as a bus, truck or the like typically includes a brake shoe and drum assembly actuated by means of an actuator assembly operated by the selective application of a fluid such as compressed air. Conventional air brake actuators have a service brake actuator for actuating the brakes under normal driving conditions by the application of compressed air and an emergency or spring brake actuator that causes actuation of the brakes when air pressure has been released. The emergency brake actuator includes a large-force compression spring that applies the brake when the air is released. This actuator is often called the spring brake. Typically, the spring brake actuator is disposed in tandem with the service brake actuator.

The spring brake actuator is typically divided into two chambers separated by a diaphragm and pressure plate, with the spring in one of the chambers acting between an end wall of the spring brake housing and the pressure plate. When full air pressure is applied to the opposite chamber, air pressure acting against the diaphragm and pressure plate compresses the spring. In many applications, a spring brake actuator rod is held in a retracted position by a relatively small return spring. In newer applications, the spring brake actuator rod is integral with the pressure plate and held in a retracted position by the air pressure.

In both designs, the spring brake actuator rod does not affect the normal operation of the brake. The service chamber is typically divided into two chambers by a diaphragm. Depressing the brake pedal during normal driving operation introduces compressed air into one of the chambers of the service brake actuator which, acting against the diaphragm, causes a service brake push rod on the other side of the diaphragm to be extended and the brakes to be applied with an application force proportional to the air pressure in the service brake actuator.

In the event of a loss of air pressure or an intentional exhaustion of air from the spring brake actuator, the brake will be mechanically activated by the force of the large-force compression spring acting on the spring brake actuator rod that, in turn, acts upon the service brake push rod to apply the brakes. Thus, the spring brake portion serves both as a parking brake and as an emergency brake.

In tandem actuator assemblies, the spring brake push rod typically extends from a chamber in the spring brake portion, through an aperture in a wall separating the spring brake actuator from the service brake actuator, and into a chamber in the service brake portion. Because at least one of the adjoining chambers is usually pressurized, an O-ring seal is provided at the aperture around the push rod.

When air pressure is released from the spring brake actuator, the spring and diaphragm extend significantly, expanding the volume of the spring brake actuator chamber containing the spring. As the volume of the spring brake actuator chamber increases, air must enter the expanded volume of the chamber to prevent subatmospheric pressure in the spring brake actuator chamber and thereby retard the application of the spring brake. When the spring is retracted, the volume of the spring chamber contracts and air must be evacuated from the chamber. In many prior brake actuators, the spring chamber is simply open to atmosphere through ports in the chamber housing. However, an open chamber allows dirt, salt, moisture and other unwanted material to enter the spring chamber through the ports. With the advent of hollow actuator rods containing caging tools, the presence of foreign material within the actuator rod has become an increasing concern of brake designers.

SUMMARY OF THE INVENTION

The invention solves the problem of venting pressurized air from the spring chamber in a spring brake actuator to the atmosphere through the spring chamber housing while simultaneously preventing the dirt, salt, moisture, and other unwanted material from entering the spring chamber by placing a check valve in an opening in the spring chamber to permit the flow of air only in the direction from the spring brake actuator chamber to the atmosphere. According to a preferred embodiment of the invention, the check valve has a double redundant trap and prevents the ingress of unwanted material into the brake. Also, the check valve is tamper resistant to avoid inadvertent removal of the check valve from the brake. The shape of the check valve is advantageously designed and the materials from which it is made are advantageously selected so that it retards the formation of ice and other similar material on the outer surface of the check valve, which formation would negatively affect the performance of the check valve. The design and material of the check valve also retard the accumulation of paint on the check valve, which may be applied to the vehicle after the installation of the check valve.

The invention relates to an improved brake actuator for a vehicle comprising a housing with an actuator rod opening at one end portion and a vent opening at another end portion. A movable member is disposed within the housing and divides the interior of the housing into a first chamber including the one end portion and a second chamber including the other end portion. The movable member reciprocally moves within the housing in response to the delivery and exhaust of pressurized fluid to and from the second chamber. An actuator rod is operably connected to the movable member and is movable therewith for operation of a brake actuator rod projecting through the actuator rod opening in the one end portion. A spring is disposed in the first chamber in a position to urge the movable member to a first position wherein the first chamber is expanded upon the exhausting of pressurized fluid from the second chamber. A passage between the first and second chambers permits fluid to flow between the two chambers. A check valve is positioned in the passage between the first and second chambers to permit fluid to flow from the second chamber to the first chamber, when pressurized fluid is exhausted from the second chamber. The check valve will close to prevent fluid flow when the second chamber is filled with pressurized fluid.

The improvement in the brake actuator comprises a check valve mounted in the vent opening in the other end portion of the housing to vent fluid in the first chamber when pressurized fluid is supplied to the second chamber to move the movable member toward the other end of the housing to collapse the spring.

BRIEF DESCRIPTION OF THE DRAWINGS

FIG. 2 is an exploded view of the check valve shown in FIG. 1;

FIG. 3 is an enlarged view of the assembled check valve in the closed position as shown in FIG. 1;

FIG. 4 is substantially identical to FIG. 3, except that the check valve is shown in the open position; and FIG. 5 is an alternate embodiment of the check valve according to the invention.

DETAILED DESCRIPTION OF THE DRAWINGS

Figure 1:
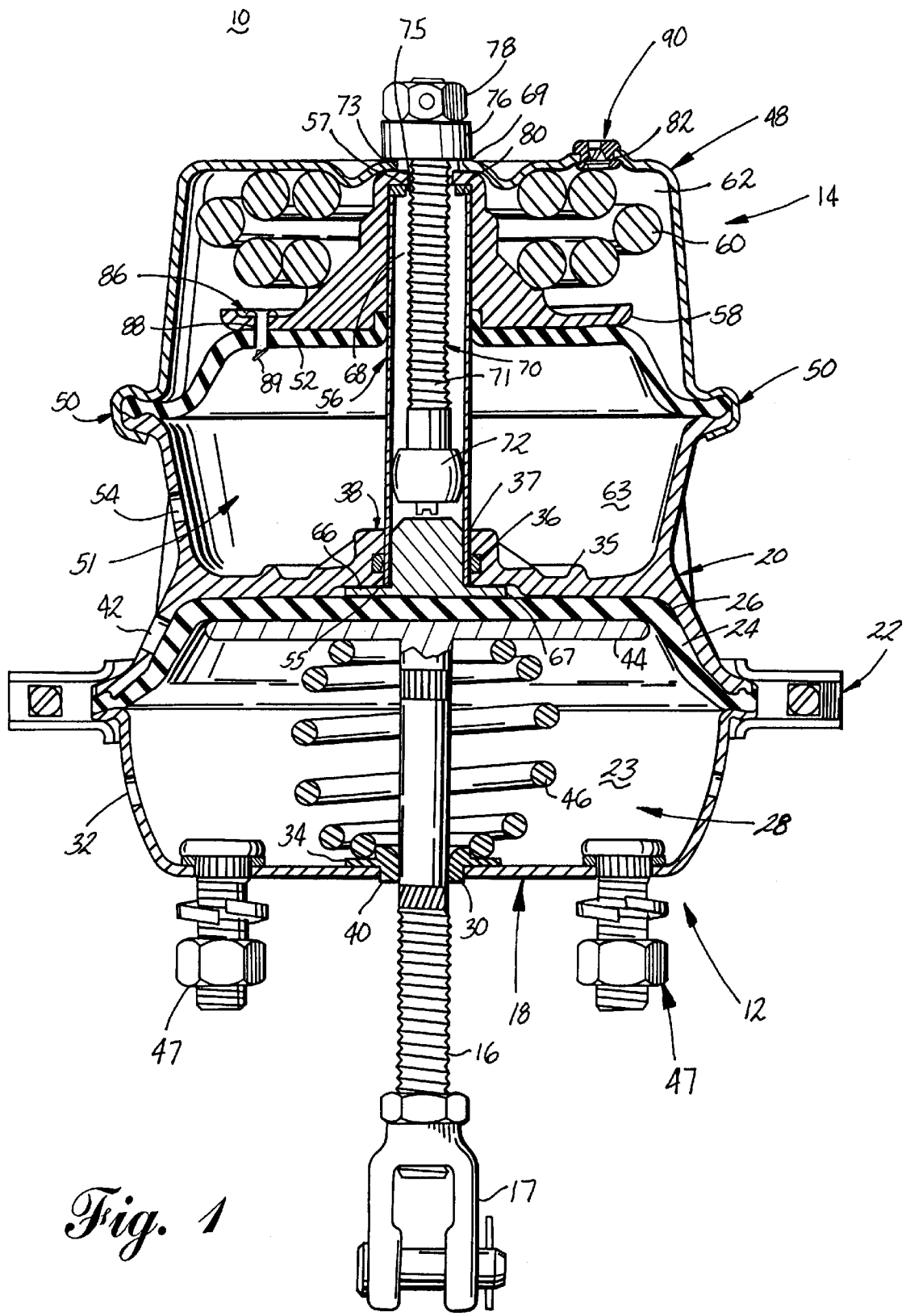
FIG. 1 is a cross-sectional view of a fluid-operated brake actuator having a check valve according to the invention.

The invention relates to a fluid-operated brake actuator with a check valve in a spring chamber. In one embodiment, the check valve is a double-redundant, tamper resistant check valve. The check valve permits pressurized air to escape from the fluid-operated brake while preventing the inflow of unwanted material, such as dirt and water. Advantageously, the design and material of the check valve tends to inhibit the accumulation of a thin layer of ice and paint on the check valve.

In an advantageous use of the invention, the check valve is described in the context of a fluid-operated brake actuator. However, the check valve can be used in many other different environments and is not limited to a fluid-operated brake. It will be helpful to first describe the fluid-operated brake since it is the preferred environment for the check valve.

FIG. 1 illustrates a fluid-operated brake actuator 10 having a general configuration well known in the art. The fluid-operated brake actuator 10 comprises a service brake actuator 12 mounted in tandem to a spring brake actuator or emergency brake actuator 14. The fluid-operated brake actuator 10 is of a tandem construction; however, the invention can be used in any type of brake, including non-tandem, fluid-operated spring brakes in which the spring chamber is separated from the service chamber.

A service brake push rod 16 extends from the service brake actuator 12 for reciprocating movement between a retracted position and an extended actuating position relative to the service brake actuator 12, and has a clevis 17 adapted to connect to a conventional brake shoe and drum (not shown) in a standard fashion. Reciprocating motion of the service brake push rod 16 provides activating means for alternately applying and releasing the brake.

The service brake actuator 12 has a housing defined by a cup-shaped service housing section 18 and a double cup-shaped adapter housing 20 joined by a clamp 22 to form a service brake chamber 23. The adapter housing 20 is also sometimes known as a flange case.

The service brake chamber 23 is divided into two sections by a dividing means, such as first elastomeric diaphragm 24 (also known as the service brake diaphragm) suspended within the service brake chamber 23. The peripheral edge of the diaphragm 24 is secured in fluid tight enclosure between the cup-shaped service housing section 18 and the service side of the adapter housing 20 by the clamp 22.

The first elastomeric diaphragm 24 separates the service brake chamber 23 into two portions: a first service chamber portion 26 and a second service chamber portion 28. The first service chamber portion 26 communicates with a source of pressurized air (not shown) through an air service port 42 in the adapter housing 20. The second service chamber portion 28 is vented to the atmosphere through at least one opening 32 in the cup-shaped service housing section 18. In FIG. 1, the first service chamber portion 26 is shown evacuated so that the first elastomeric diaphragm 24 is forced against the adapter housing 20 because of the force from compression spring 46 in the second service chamber portion 28.

The service brake push rod 16 extends through a central opening 30 in the cup-shaped service housing section 18 and has a pressure plate 44 at the end thereof within the second service chamber portion 28. The pressure plate 44 bears against the first elastomeric diaphragm 24. A compression spring 46 extends between the pressure plate 44 and the interior surface of the cup-shaped service housing section 18. A push rod guide 34 having an annular seat 40 is disposed within the central opening 30 to guide reciprocal movement of the service brake push rod 16 within the central opening 30 and also to receive the end of the compression spring 46 and retain it in position around the central opening 30. The compression spring 46 urges the pressure plate 44 and the service brake push rod 16 to a fully retracted position as depicted in FIG. 1.

To operate the service brake actuator 12, compressed air is introduced through the air service port 42 into the first service chamber portion 26 to create a force directed against the first elastomeric diaphragm 24 and pressure plate 44 sufficient to overcome the force of the compression spring 46, thereby extending the service brake push rod 16 toward the actuating position. The openings 32 permit rapid evacuation of air from the second service chamber section 23 as the service brake is actuated. Mounting studs 47 are provided to mount the fluid-operated brake actuator 10 onto a vehicle (not shown).

The spring actuator or emergency brake actuator 14 has a housing defined by the spring side of the adapter housing 20 and a generally cylindrical head or spring chamber 48, which is clamped to the spring side of the adapter housing 20 by a clamp 50 to form the spring brake chamber 51. The spring brake actuator is divided into two portions, preferably by dividing means, such as a second elastomeric diaphragm 52, known as the spring brake diaphragm, which is suspended within the spring brake chamber 51. The peripheral edge of the spring brake diaphragm 52 is secured in fluid tight enclosure between the cylindrical head 48 and the spring side of the adapter housing 20 by the clamp 50. The second elastomeric diaphragm 52 divides the spring brake chamber 51 into two portions: a first spring brake chamber 62 and a second spring brake chamber 63. The second spring brake chamber 63 is filled with pressurized air supplied through an air service port 54 in the adapter housing 20 when the emergency brake is in its normal released position as depicted in FIG. 1.

The adapter housing 20 includes a divider wall 35 that separates the adjoining service brake chamber 23 and spring brake chamber 51. A spring brake actuator rod 56, aligned with the service brake push rod 16, has one end extending from the spring brake chamber 51 through a divider wall opening 37 in divider wall 35 for reciprocating motion through the divider wall opening 37 between a retracted position and an actuating position. One or more O-ring seals 36 are provided in the divider wall opening 37 through which the spring brake actuator rod 56 reciprocates.

A distal end 55 of the spring brake actuator rod 56 terminates in a reaction plate 66 in the first service chamber portion 26, and which is received in an annular seat 67 when the spring brake actuator rod 56 is in the retracted position as depicted in FIG. 1, an opposite, proximal end 57 of the actuator rod 56 extends through an opening 53 in the second elastomeric diaphragm 52 and terminates in a pressure plate 58 that abuts an end of a large force compression spring 60. The pressure plate 58 abuts one end of the compression spring 60.

A valve 86 extends through the pressure plate and the elastomeric diaphragm to fluidly connect the first and second spring brake chambers 62 and 63. When pressurized fluid is exhausted from the second spring brake chamber, the valve 86 permits the flow of fluid from the second spring brake chamber 63 into the first spring brake chamber 62 to prevent a vacuum or low pressure area, with respect to the pressure in the second spring brake chamber 63, from developing in the first spring brake chamber 62.

The valve 86 has an outer tubular portion 88, which extends through the pressure plate 58 and elastomeric diaphragm 52. A spring arm 89 is mounted to the lower end of the tubular portion 88. The spring arm closes the tubular portion 88 upon the addition of pressurized fluid to the lower spring chamber 63. Upon the release of pressurized air from the lower spring chamber 63, the inherent resiliency of the spring arm 89 unseals the tubular portion 88 to fluidly connect the first spring brake chamber 62 and the second spring brake chamber 63. The valve 86 is further described in U.S. Pat. application Ser. No. 08/213,441.

The spring brake actuator rod 56 can be solid, but is preferably a hollow tube or rod provided with a central bore 68 to accommodate a brake release bolt or caging tool 70. The central bore 68 of the spring brake actuator rod 56 receives the caging tool 70, which passes through aligned apertures 69, 73, and 75 in the cylindrical head 48, pressure plate 58 and spring brake actuator rod 56, respectively. The caging tool 70 comprises a threaded elongated shaft 71, with one end having an enlarged head portion 72. The opposite end of the caging tool 70 is threaded through a head nut 76 fixedly mounted to the cylindrical head 48, and has a hex head nut 78 fixedly secured thereto.

The caging tool 70 primarily serves to enable manual retraction of the powerful compression spring 60. Rotation of the hex head nut 78, threads the shaft 71 through the head nut 76, to axially move the caging tool 70 with respect to the cylindrical head 48. The enlarged head portion 72 slides freely within the central bore 68 of the spring brake actuator rod 56, yet is restrained by an inwardly directed annular flange 80 at the actuator rod proximal end 57. Thus, withdrawal of the caging tool 70 by rotation of the hex head nut 78, causes the enlarged head portion 72 to abut the annular flange 80, and retract the pressure plate 58 and compression spring 60. For safety, the compression spring 60 is typically retracted during repairs to the brake actuator 10 and during shipping.

The cylindrical head 48 includes one or more ports 82 therein which establish communication between the first spring brake chamber 62 and the atmosphere. A one-way check valve 90 according to the invention, installed in each port 82, controls the flow of air through the port from the first spring brake chamber 62 to the atmosphere. The one-way check valve 90 vents air to the atmosphere whenever the pressure differential between the first spring brake chamber 62 and the atmosphere is preferably about two psig (the cracking pressure) to maintain a slight positive pressure in the first spring brake chamber 62. However, the check valve 90 can be designed to operate at any cracking pressure, which varies depending on the particular environment in which the spring brake actuator is used.

Referring to FIG. 2, the check valve 90 can be seen in greater detail. The check valve 90 has several major components, which include a tubular body 92, first valve 94, second valve 96, and support plate 98. The tubular body 92 and the first valve 94 are preferably made from a suitable elastomeric material and integrally molded as a single piece. The preferred elastomers include, but are not limited to a self-blooming rubber, such as Polydis TR121, sold by Struktol, Inc., which excretes wax. The rubbers tend to prevent the accumulation of paint and ice on the tubular body 92 and first valve 94 by coating the surface of the elastomer with oil or wax, respectively.

The tubular body 92 has an aperture 102 extending axially therethrough. The aperture 102 begins at an inlet end 104 of the tubular body and terminates at an outlet end 106. The inlet end 104 is in fluid communication with the first spring brake chamber 62 so that compressed fluid within the first spring chamber can flow freely into the aperture 102 of the tubular body 92. In a similar manner, the outlet end 106 is in fluid communication with the atmosphere so that fluid entering the inlet end 104 can exhaust to the atmosphere through the outlet end 106.

The tubular body 92 further comprises a first radially extending lip 108 disposed about the circumference of the tubular body 92 near the inlet end 104. In a complementary fashion, a second radially extending lip 110 is disposed about the circumference of the tubular body near the outlet end 106. An annular channel 112 is formed between the first and second lips 108, 110. Preferably, the annular channel 112 is sized to snugly receive the edge of the housing port 82. An annular groove 114 is formed in the tubular body 92 and connects with the aperture 102. Depending on the application, the annular groove 114 can extend beyond the tubular body 92 and into the first lip 308.

The first valve 94 comprises one or more flaps 120, which are preferably sector-shaped, formed by one or more slits 130. The flaps 120 have an integrally formed brace 122, which is somewhat trapezoidal in shape, expanding in width and height from the point of the sector-shaped flap. The widest and tallest portion of the brace 122 is the portion closest to the tubular body 92 and the narrowest and shortest portion of the brace is closest to an axial centerline of the aperture 102. When the tubular body is not assembled in the housing port 82, as illustrated in FIG. 2, a gap 124 is present between the brace 122 and the tubular body 92. In the preferred embodiment the gap is approximately 15 thousandths of an inch.

The flaps 120 are pivotally connected to the tubular body 92 by a living hinge 126. The thickness of the living hinge 126 is a compromise between providing enough material to properly structurally support and retain the flap 120 to the tubular body 92 and providing less material to maximize the ease of bending of the flap with respect to the tubular body 92. To obtain the proper balance between the structural requirements and the bending requirements, an annular groove 128 is formed in the upper surface of the first valve 94 directly above the gap 124 to control the thickness of the living hinge 126. The annular groove 128 reduces the amount of material connecting the flap 120 to the tubular body 92 and provides an easy way to obtain the proper balance between the required material for structural stability and pivoting of the flap. The depth of the annular groove 128 can be varied to obtain the necessary balance for a given application.

The second valve 96 comprises an elastomeric disk 140 having multiple recesses 142 formed in the perimeter edge of the elastomeric disk 140. The elastomeric disk 140 has multiple flaps 144, which are sector-shaped, formed by slits 146. Preferably, the slits 146 do not extend to the perimeter of the elastomeric disk.

The support plate 98 comprises a metal disk 150, preferably made of stainless steel, which, like the elastomeric disk 140, has multiple recesses 152 formed in the perimeter edge of the metal disk 150. A number of perforations 154 are formed in the disk 150. The perforations are sector-shaped, like the flaps 144. The perforations 154 are preferably somewhat smaller than the flaps 144.

To assemble the check valve 90, the tubular body 92 is mounted within the check valve port by deforming the second lip 110 so that the tubular body and second lip can be inserted into the check valve port until the edge of the housing aligns with the annular channel 112. The tubular body 92 is then released from its deformed state and the inherent resiliency of the tubular body returns it to its original shape so that the edge of the housing is snugly received within the annular channel 112.

The outer diameter of the tubular body is slightly greater than the inner diameter of the check valve port so that when the tubular body 92 is inserted into the check valve port, the tubular body is deformed radially inwardly and fills in the gap 124, so that the braces 122 are in contact with the tubular body 92. Thus, the inward deflecting of the flaps 120 of the first valve 94 is substantially prevented because the brace 122 is contact with the tubular body 92. However, the flaps 120 are still free to pivot upwardly and outwardly in response to pressurized air exiting through the inlet end 104 of the tubular body. Preferably, the outer diameter of the tubular body is approximately 30 to 40 thousandths of an inch greater than the diameter of the check valve port 82.

The second valve 96 and the support plate 98 are then mounted to the tubular body 92. First, the perforations 144 of the metal disk 150 are aligned with the flaps of the elastomeric disk 140 by aligning the recesses 142, 152 of the metal disk 150 and the elastomeric disk. The aligned elastomeric disk 140 and metal disk 150 are then inserted into the annular groove 114 of the tubular body 92. The elastomeric disk 140 and metal disk 150 can be inserted into the annular groove 114 before or after the tubular body 92 is mounted within the check valve port 82. However, it is preferred that they are mounted in the annular groove after the tubular body 92 is mounted within the check valve port 82.

The elastomeric disk 140 and metal disk 150 are aligned so that the edges of the flaps 144 lie on the portions of the metal disk 150 surrounding the perforations 154. In this manner, the edges of the flaps 144 are supported by the metal disk, which tends to prevent the flaps 144 from being drawn into the perforations 154 if a vacuum or low pressure area is formed within the first spring brake chamber 62.

In operation, as the spring brake is released by the introduction of pressurized fluid into the second spring brake chamber 63, the second elastomeric diaphragm 52 along with the pressure plate 58 are moved toward the top of the housing 48 to reduce the volume of the first spring brake chamber 62 and compress the air within the chamber. The compression of the air creates a pressure differential between the first spring brake chamber 62 and the atmosphere. When the pressure differential reaches the cracking pressure of the second valve, the flaps 144 of the second valve 96 are forced upwardly and out of contact with the metal disk 150. The pressurized air then encounters the flaps 120 of the first valve 94. When the pressure differential reaches the cracking pressure of the first valve, the flaps 120 deflect or pivot upwardly as depicted in FIG. 4. In this state, when both the first and second valves are opened, the pressurized air is free to flow from the first spring brake chamber 62 to the atmosphere. Preferably, the cracking pressure of the first and second valves are approximately equal; but, equal cracking pressures are not necessary to practice the invention.

As the pressure differential decreases, the flaps 144 of the second valve 96 return to their abutting relationship with respect to the metal disk 150 and seal the first spring brake chamber 62 with respect to the atmosphere, resulting in the subsequent return of the flaps 120 to their sealed positions. The sealing of the second valve prior to the first valve aids in preventing the ingress of material into the first spring brake chamber 62 because compressed air is still flowing out of the first valve as the second valve seals. Any material that happens to make its way through the first valve is trapped between the first and second valves is expelled upon the next exhaustion of air through the check valve.

The outward pivotal movement of the flaps 120 aids the check valve from being plugged by paint. The pressure differential urges the flaps 120 outwardly to place any layer of paint covering the flaps 120 under tension, which tends to break the paint layer, preventing it from clogging the check valve.

A positive pressure with respect to the atmosphere is maintained within the first spring brake chamber 62 because the first and second one-way valves seal at a positive pressure slightly less than the cracking pressure. The positive pressure aids in preventing the ingress of material into the valve because fluid is flowing from the first spring brake chamber 62 to the atmosphere as the first and second one-way valves close, unlike a low pressure or vacuum, which would draw material into the first spring brake chamber 62. A low pressure or vacuum is prevented from forming in the first spring brake chamber 62 by valve 86, which lets fluid flow from the second spring brake chamber 63 to the first spring brake chamber 62 upon application of the brake.

In addition to supporting the elastomeric disk 140, the metal disk 150 provides the independent function of preventing the easy removal of the tubular body 92 from the check valve port 82 after it is installed. The metal disk 150 is sized so that when it is received within the annular groove 114 it stiffens the first lip 108. By stiffening the first lip 108, the check valve is more secure against tampering. The tubular body 92 cannot be easily removed from the check valve port 82 because the metal disk 150 prevents the easy deformation of the first lip 102, which is required for the removal of the tubular body 92. It is preferred that the metal disk 150 have a diameter greater than the diameter of the check valve port 82. However, it is not necessary for the metal disk 150 to have such a diameter in order to provide the necessary stiffening of the first lip 108 needed to prevent the easy withdrawal of the tubular body 92. The metal disk 150 can have a diameter less than the diameter of the check valve port 82 and still adequately perform the stiffening function that is necessary to retard tampering of the check valve by pulling it from the check valve port.

FIG. 5 illustrates an alternate embodiment of the check valve 90 according to the invention. The alternate embodiment is substantially identical to the check valve 90. Therefore, like numerals will be used to identify like parts.

The only substantial difference between the check valve illustrated in FIGS. 1 through 4 and the second embodiment check valve illustrated in FIG. 5 is the addition of a duck bill flap 160 comprising first bill 162 and second bill 164, between which there is formed a narrow rectangular opening 166. The duck bill flap is illustrated as having a lower annular ring 168, which is secured press fit within an annular recess 170 formed in the second lip 110. Alternatively, the duck bill 160 can be integrally molded with the second lip 110. The duck bill flap reduces the possibility that the accumulation of ice, mad and similar material on the first valve will clog the first valve.

It is also within the scope of the invention for the duck bill flap to be replaced by a hose that is mounted to the check valve in the same manner as the duck bill flap. The hose is of a sufficient length to be draped over the side of the brake housing so no material can easily enter the check valve through the hose.

Reasonable variation and modification are possible within the scope of the foregoing disclosure without departing from the spirit of the invention which is defined in the accompanying claims. For example, the check valve according to the invention can be constructed without the second valve and still perform the tamper-resistant function. In a similar vein, the check valve can be used without the second valve and the support plate and still provide a solution to the problem of exhausting air to the atmosphere while sealing the first spring chamber.

The embodiments of the invention in which an exclusive property or privilege is claimed are defined as follows:

1. In a brake actuator for a vehicle comprising:

a housing with an actuator rod opening at one end portion and a vent opening at another end portion, the vent opening defined by an edge of the housing, the housing having an inner surface and an outer surface;

a movable member disposed within the housing, the movable member dividing the interior of the housing into a first chamber including the one end portion and a second chamber including the other end portion and reciprocally movable there in response to the delivery and exhaust of pressurized fluid to and from the second chamber, respectively;

an actuator rod operably connected to the movable member and movable therewith for operation of a brake, the actuator rod projecting through the actuator rod opening in the one end portion;

a spring disposed in the first chamber in a position to urge the movable member to a first position wherein the second chamber is collapsed upon exhaust of pressurized fluid from the second chamber;

a passage between the first and second chambers to pass fluid between the two;

a valve in the passage between the first and second chambers to permit fluid to flow from the second chamber to the first chamber but prevent fluid from flowing from the first chamber to the second chamber; and a check valve mounted in the vent opening in the other end portion of the housing to vent fluid from the first chamber when pressurized fluid is supplied to the second chamber to move the movable member toward the other end of the housing to collapse the spring, the improvement comprising:

the check valve having:

a generally tubular elastomeric body having an aperture extending therethrough with opposing inlet and outlet ends, the body further having an inner lip and an outer lip, each spaced from the other and extending radially outwardly from the body to define a channel therebetween, and the channel being sized to snugly receive the edge with the inner and outer lips bearing against the inner and outer surfaces, respectively, when the body is received in the opening;

a substantially rigid plate having at least one perforation and mounted to the body near the inner lip and the inlet end and spanning the aperture, said plate having a diameter sized to stiffen a portion of the tubular body; and a one-way valve disposed near the outer lip and the outlet end of the body to permit fluid flow from the inlet end through the outlet end and inhibit fluid flow from the outlet end through the inlet end;

so that when the check valve is mounted within the opening, the plate will prevent the withdrawal of the check valve through the opening from the first surface toward the second surface.

2. A brake actuator according to claim 1 wherein the tubular body is made of a self-waxing rubber.

3. A brake actuator according to claim 1 and further comprising a second one-way valve spanning the aperture and axially disposed between the plate and the first one-way valve.

4. A brake actuator according to claim 3 wherein the second one-way valve is an elastomeric disk having at least one flap.

5. A brake actuator according to claim 4 wherein the at least one flap is aligned with the at least one perforation in the plate.

6. A brake actuator according to claim 5 wherein the at least one flap is larger than the at least one perforation and the at least one flap has edges abutting a portion of the plate surrounding the at least one perforation to support the at least one flap.

7. A brake actuator according to claim 5 wherein the shape of the at least one flap corresponds to the shape of the at least one perforation.

8. A brake actuator according to claim 7 wherein the at least one flap and the at least one perforation are sector-shaped.

9. A brake actuator according to claim 1 wherein the plate has multiple perforations.

10. A brake actuator according to claim 9 wherein the perforations are sector-shaped.

11. A brake actuator according to claim 1 wherein an annular groove is formed in the body at a position radially inwardly of the inner lip and extends into the aperture and the plate is received in the annular groove to stiffen the inner lip.

12. A brake actuator according to claim 11 and further comprising a second one-way valve spanning the aperture and received within the annular groove in an axial position between the plate and the first one-way valve.

13. A brake actuator according to claim 11 wherein the annular groove extends into the inner lip.

14. A brake actuator according to claim 13 wherein the plate has a diameter greater than the diameter of the aperture.

15. A brake actuator according to claim 14 wherein the diameter of the plate is at least equal to the diameter of the annular groove.

16. A brake actuator according to claim 1 wherein the first one-way valve is an elastomeric disk spanning the aperture and having at least one flap formed therein to the body to open and close the first one-way valve.

17. A brake actuator according to claim 16 wherein the at least one flap is pivotally mounted to the body.

18. A brake actuator according to claim 17 wherein the at least one flap is pivotally connected to the body by a living hinge.

19. A brake actuator according to claim 16 and further comprises a brace extending into the aperture and positioned adjacent the body to limit the inward pivotal movement of the at least one flap.

20. A brake actuator according to claim 16 wherein the first one-way valve has multiple flaps.

21. In a brake actuator for a vehicle comprising:
a housing with an actuator rod opening at one end portion and a vent opening at another end portion, the vent opening defined by an edge of the housing, the housing having an inner surface and an outer surface;
a movable member disposed within the housing, the movable member dividing the interior of the housing into a first chamber including the other end portion and a second chamber including the one end portion and reciprocally movable therein in response to the delivery and exhaust of pressurized fluid to and from the second chamber, respectively;
an actuator rod operably connected to the movable member and movable therewith for operation of a brake, the actuator rod projecting through the actuator rod opening in the one end portion;
a spring disposed in the first chamber in a position to urge the movable member to a first position wherein the second chamber is collapsed upon exhaust of pressurized fluid from the second chamber;
a passage between the first and second chambers to pass fluid between the two;
a valve in the passage between the first and second chambers to permit fluid to flow from the first chamber to the second chamber but prevent fluid from flowing from the second chamber to the first chamber; and
a check valve mounted in the vent opening in the other end portion of the housing to vent fluid from the first chamber when pressurized fluid is supplied to the second chamber to move the movable member toward the other end of the housing to collapse the spring, the improvement comprising:
the check valve having:
a generally tubular elastomeric body having an aperture extending therethrough with opposing inlet and outlet ends, the body further having an inner lip and an outer lip, each spaced from the other and extending radially outwardly from the body to define a channel therebetween, and the channel being sized to snugly receive the edge with the inner and outer lips bearing against the inner and outer surfaces, respectively, when the body is received in the opening;
a substantially rigid plate having at least one perforation and mounted to the body near the inner lip and the inlet end and spanning the aperture, said plate having a diameter sized to stiffen a portion of the tubular body; and
a one-way valve disposed near the outer lip and the outlet end of the body to permit fluid flow from the inlet end through the outlet end and inhibit fluid flow from the outlet end through the inlet end;
so that when the check valve is mounted within the opening, the plate will prevent the withdrawal of the check valve through the opening from the inner surface toward the outer surface.

22. In a brake actuator for a vehicle comprising:
a housing with an actuator rod opening at one end portion and a vent opening at another end portion, the vent opening defined by an edge of the housing, the housing having an inner surface and an outer surface;
a movable member disposed within the housing, the movable member dividing the interior of the housing into a first chamber including the other end portion and a second chamber including the one end portion and reciprocally movable therein in response to the delivery and exhaust of pressurized fluid to and from the second chamber, respectively;
an actuator rod operably connected to the movable member and movable therewith for operation of a brake, the actuator rod projecting through the actuator rod opening in the one end portion;
a spring disposed in the first chamber in a position to urge the movable member to a first position where in the second chamber is collapsed upon exhaust of pressurized fluid from the second chamber;
a passage between the first and second chambers to pass fluid between the two;
a valve in the passage between the first and second chambers to permit fluid to flow from the first chamber to the second chamber but prevent fluid from flowing from the second chamber to the first chamber; and
a check valve mounted in the vent opening in the other end portion of the housing to vent fluid from the first chamber when pressurized fluid is supplied to the second chamber to move the movable member toward the other end of the housing to collapse the spring, the improvement comprising;
the check valve having:
a generally tubular elastomeric body having an aperture extending therethrough with opposing inlet and outlet ends, the body further having an inner lip and an outer lip, each spaced from the other and extending radially outwardly from the body to define a channel therebetween, and the channel being sized to snugly receive the edge with the inner and outer lips bearing against the inner and outer surfaces, respectively, when the body is received in the opening;
a first one-way valve disposed near the outlet end of the body to permit fluid flow from the inlet end through the outlet end and inhibit fluid flow from the outlet end through the inlet end; and
a second one-way valve mounted near the outlet end of the body to provide for the exhausting of a fluid passing through the first one-way valve through the outlet end.

23. In a brake actuator for a vehicle comprising:
a housing with an actuator rod opening at one end portion and a vent opening at another end portion, the vent opening defined by an edge of the housing, the housing having an inner surface and an outer surface;
a movable member disposed within the housing, the movable member dividing the interior of the housing into a first chamber including the other end portion and a second chamber including the one end portion and reciprocally movable therein in response to the delivery and exhaust of pressurized fluid to and from the second chamber, respectively;
an actuator rod operably connected to the movable member and movable therewith for operation of a brake, the actuator rod projecting through the actuator rod opening in the one end portion;
a spring disposed in the first chamber in a position to urge the movable member to a first position wherein the second chamber is collapsed upon exhaust of pressurized fluid from the second chamber;
a passage between the first and second chambers to pass fluid between the two;

a valve in the passage between the first and second chambers to permit fluid to flow from the first chamber to the second chamber but prevent fluid from flowing from the second chamber to the first chamber; and a check valve mounted in the vent opening in the other end portion of the housing to vent fluid from the first chamber when pressurized fluid is supplied to the second chamber to move the movable member toward the other end of the housing to collapse the spring, the improvement comprising:

the check valve having:

a generally tubular elastomeric body having an aperture extending therethrough with opposing inlet and outlet ends, the body further having an inner lip and an outer lip, each spaced from the other and extending radially outwardly from the body to define a channel therebetween, and the channel being sized to snugly receive the edge with the inner and outer lips bearing against the inner and outer surfaces, respectively, when the body is received in the opening; and a one-way valve disposed near the outlet end of the body to permit fluid flow from the inlet end through the outlet end and inhibit fluid flow from the outlet end through the inlet end, the one-way valve comprising an elastomeric disk spanning the aperture and has at least one flap formed therein and movably mounted to the body to open and close the one-way valve, and the at least one flap having a brace extending into the aperture and positioned adjacent the body to limit the inward pivotal movement of the flap.

24. A check valve adapted to mount to a structural member having opposing first and second surfaces and an opening extending therethrough defined by an edge, the check valve comprising:

a generally tubular elastomeric body having an aperture extending therethrough with opposing inlet and outlet ends, the body further having an inner lip and an outer lip, each spaced from the other and extending radially outwardly from the body to define a channel therebetween, and the channel being sized to snugly receive the edge with the inner and outer lips bearing against the first and second surfaces, respectively, when the body is received in the opening;

a substantially rigid plate having at least one perforation and mounted to the body near the inlet end and spanning the aperture, said plate having a diameter sized to stiffen a portion of the tubular body near the inner lip; and a one-way valve disposed near the outlet end of the body to permit fluid flow from the inlet end through the outlet end and prohibit fluid flow from the outlet end through the inlet end;

so that when the check valve is mounted within the opening, the plate will prevent the withdrawal of the check valve through the opening from the first surface toward the second surface.

* * * * *